July 11, 1944.  E. A. ILEMAN  2,353,470

RECLOSING CIRCUIT BREAKER

Filed July 16, 1941  4 Sheets-Sheet 1

Fig.1.

INVENTOR
EMIL A. ILEMAN
BY
Lawrence K. Sager
his ATTORNEY

July 11, 1944.   E. A. ILEMAN   2,353,470
RECLOSING CIRCUIT BREAKER
Filed July 16, 1941   4 Sheets-Sheet 2

INVENTOR
EMIL A. ILEMAN
BY
Lawrence K. Sager
his ATTORNEY

July 11, 1944.　　　　E. A. ILEMAN　　　　2,353,470
RECLOSING CIRCUIT BREAKER
Filed July 16, 1941　　　　4 Sheets-Sheet 3

INVENTOR
EMIL A. ILEMAN
BY
Lawrence K. Sager
his ATTORNEY

July 11, 1944.  E. A. ILEMAN  2,353,470

RECLOSING CIRCUIT BREAKER

Filed July 16, 1941  4 Sheets-Sheet 4

INVENTOR
EMIL A. ILEMAN
BY
Lawrence K. Sager
his ATTORNEY

Patented July 11, 1944

2,353,470

UNITED STATES PATENT OFFICE 2,353,470

RECLOSING CIRCUIT BREAKER

Emil A. Ileman, Bethlehem, Pa., assignor, by mesne assignments, to Realty and Industrial Corporation, Convent, N. J., a corporation of New Jersey Application July 16, 1941, Serial No. 402,580

16 Claims. (Cl. 200—89)

This application relates to the control of circuit breakers wherein upon the occurrence of an automatic tripping of the breaker, the same is automatically reclosed periodically and if the fault or overload persists which initially caused the breaker to open, the breaker will remain open after a certain number of reclosures.

The invention is especially applicable to rural distribution lines for preventing prolonged interruption of service on the main line controlled by the breaker or on any of the branches fed from the main line.

One important object of the invention is to cause the breaker to remain closed, upon each reclosing, a predetermined time interval which shall be long enough to permit the fuse or fuses to open and thereby disconnect the faulty branch circuit. After such disconnection, the breaker will remain closed after a reclosure because the faulty branch circuit has then been disconnected from the main line controlled by the breaker. This action thereby insures continuity of service on the main line and on all branches other than the particular faulty branch circuit. Another object is to insure that if the fault persists without disconnection and isolation of the faulty branch circuit, then the breaker will remain open after a certain number of automatic reclosures. The breaker must then be closed manually after the fault has been remedied or after the faulty branch circuit has been otherwise disconnected from the main line. Another object is to insure that in case the overload exceeds a predetermined limit for which the breaker is set, or the fault is either phase-to-phase or 3-phase, the breaker will open instantly upon reclosure without allowing any time interval for the branch fuse or fuses to burn out. Other objects are to provide a durable and dependable self-contained controlling mechanism and adapted for outdoor use on pole lines and operable over long periods without the necessity of frequent inspection and repairs. Other objects and advantages will be understood from the following description and accompanying drawings which illustrate a preferred embodiment of the invention.

Figures 2, 4:
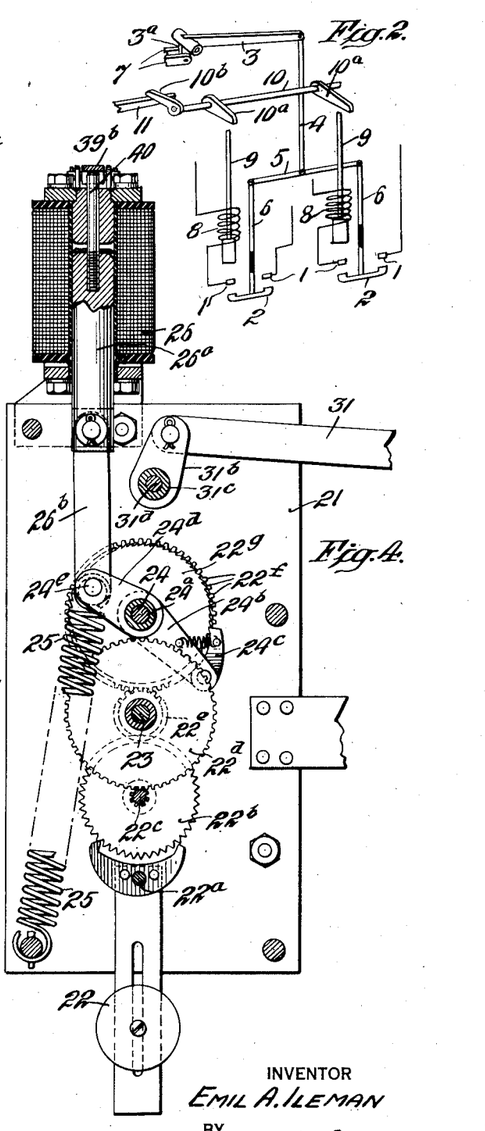
Fig. 2 is a diagrammatic sketch generally indicating certain of the circuit breaker parts and the tripping mechanism.
Fig. 4 is a section on the line 4—4 of Fig. 3.

Any suitable form of breaker may be controlled by the mechanism and Fig. 2 indicates a 2 pole breaker, although it may have any desired number of poles and the actuating mechanism may likewise be of any desired form. In Fig. 2 the fixed contacts 1 are connected in the main line circuits and the movable contacts 2 move upwardly to engage the fixed contacts and close the breaker. The breaker is indicated as being closed by a pivoted bell crank lever having a long arm 3 pivotally connected to a rod 4 which in turn is pivotally connected to a bar 5 which in turn is connected to the lifting rods 6 of the movable contacts. A short arm 3a of the closing lever is shown extending downwardly and pivotally connected thereto is a pair of links 7 which when moved to the right will close the breaker contacts.

In one of the main lines leading to each pair of fixed contacts is connected an overload tripping coil 8 of a magnet which, when the current exceeds a predetermined value, will raise one or more of the trip rods 9. These rods are adapted to engage arms 10a fixed to the trip shaft 10 and when engaged by one or more of the trip rods 9 will turn the shaft 10 and cause the arm 10b fixed thereto, to move downwardly and depress the lever 11.

Figure 1:
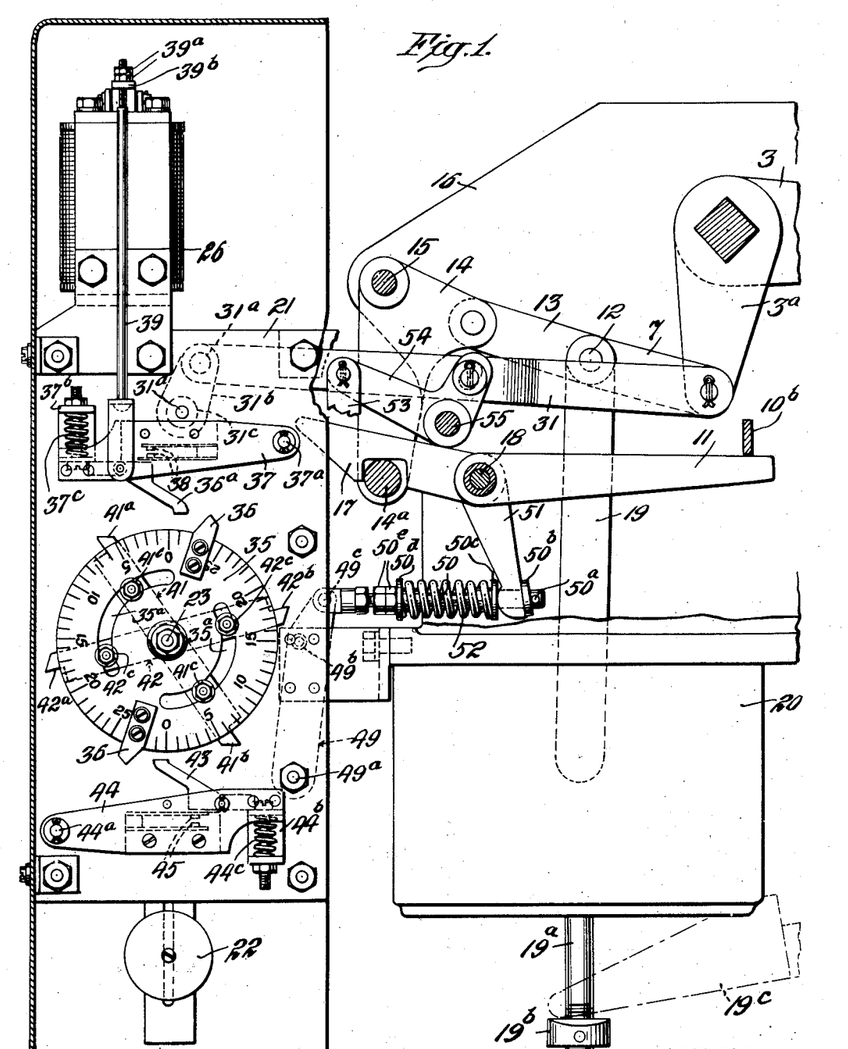
Fig. 1 is a side view of the control mechanism, partly in section.

Referring to Fig. 1, the arms 3 and 3a are indicated in the upper right-hand portion of the figure, the arm 3a being shown connected to links 7. Fig. 1 shows the actuating parts of the breaker in positions corresponding to the closed position of the breaker. The links 7 are in turn connected by a pin 12 to a second pair of links 13, as further shown in Fig. 5. The links 13 are connected by a pin to another pair of links or plates 14 which are pivotally supported on a pin 15, the pin being carried in turn by bearing supports which extend inwardly from the two fixed plates 16 of the supporting structure. The plates 14 are provided with downwardly extending arms which carry between their lower ends a pin 14a. This pin is normally engaged by a latch 17 which is fixed to the latch shaft 18, the latter being pivotally mounted at its outer ends in the two frame plates 16. The latch shaft also has fixed thereto an arm or lever 11 which corresponds to the lever 11 already referred to with reference to Fig. 2 and which is engaged by the arm 10b of the trip shaft.

The links 7 and 13 form a toggle and to the pin 12 connecting them is also connected a pair of links 19 which extend downwardly and are pivotally connected to the core of a solenoid 20 which is suitably supported by the frame. With the parts in the position as shown in Fig. 1, it is evident that upon the occurrence of an overload which would cause the actuation of one or more of the trip rods 9, the arm or lever 11 would be depressed and turn the latch shaft 18 to release the pin 14a. This pin would then move to the left of Fig. 1 owing to the links 13 and 14 being underset, and would permit the pin connection between these links to move downwardly. This would cause the overset toggle formed by the links 7 and 13 to be disturbed and permit the pin 12 to move upwardly carrying the plunger of the solenoid with it. This movement permits the arm 3a to move in a clockwise direction and thereby cause the opening of the breaker contacts. When the breaker has assumed its fully open position, upward movement of the links 7 and pin 12 has caused the links 13 to rotate the links 14 in a counterclockwise direction and has thereby brought the pin 14a under the latch 17 so as to hold it in position for the reclosing of the breaker. The breaker may then be closed by energizing the solenoid 20 which draws the pin 12 downwardly and causes the parts to assume again the position shown in Fig. 1, the oversetting of the links 7 and 13 beyond the dead center serving to lock the breaker closed even after deenergization of the closing solenoid winding. Although a particular form of closing and latching mechanism has been described, any other suitable form of mechanism may be used.

The control mechanism fulfills several functions automatically and in the particular embodiment shown comprises a clock mechanism which is rewound automatically. The clock mechanism when released, actuates a shaft on opposite ends of which are mounted two controlling dials which control the reclosing of the breaker, the means for temporarily holding the breaker closed after reclosure and the means for rewinding the clock mechanism.

Figure 3:
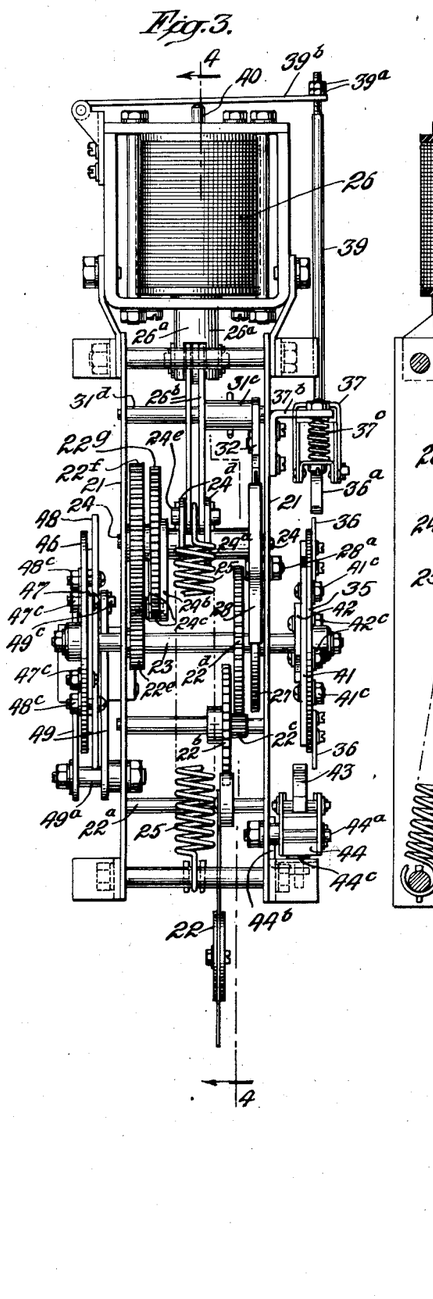
Fig. 3 is a side elevation of the control mechanism looking at the left of Fig. 1 and with the casing removed.

The controlling mechanism is mounted between two vertically extending supporting plates 21 spaced apart from each other, as well shown in Figs. 3 and 4. Considering first the clock mechanism, the pendulum 22 is shown pivotally supported on a shaft 22a and carries an escapement which engages the gear 22b rotatably mounted on a shaft between the plates 21. The gear 22b is driven by the small pinion 22c which in turn is driven by the gear 22d which is fixed to the control shaft 23. This shaft is driven by a pinion 22e which in turn is driven by the gear 22f. This gear is rotatably mounted on a shaft 24 and secured to this gear is a rachet wheel 22g. A sleeve 24a is rotatably mounted on the shaft 24 and at one end carries a radially extending arm 24b. The outer end of this arm carries a pivoted pawl 24c which is spring pressed to normally engage the rachet wheel 22g. On the sleeve 24a, at its middle portion are a pair of radially extending arms 24d which carry a pin 24e between their outer ends. A spring 25 is fixed at one end to this pin and extends downwardly and is connected at its lower end to a cross pin extending between the two plates 21. It is apparent that when the rachet wheel 22g is free to turn, the spring will serve through the pawl and rachet wheel to actuate the train of gears under control of the escapement and thus drive the main controlling shaft 23.

The clock mechanism is automatically rewound electromagnetically by a solenoid having a winding 26 and a plunger 26a positioned above the clock mechanism. This plunger is connected by a pair of links 26b to the pin 24e. The parts are shown in Figs. 3 and 4 in the attracted position of the solenoid and the spring 25 is then under its full tension. After partial rotation of the rachet wheel 22g, the pin 24e and plunger 26a will assume a lower position than that shown; and then when the solenoid 26 is energized, the plunger will be drawn upwardly to the position shown and thereby automatically maintain the spring under constant tension. The solenoid 26 is energized at certain times automatically by means hereinafter described.

Figures 6, 7, 8:
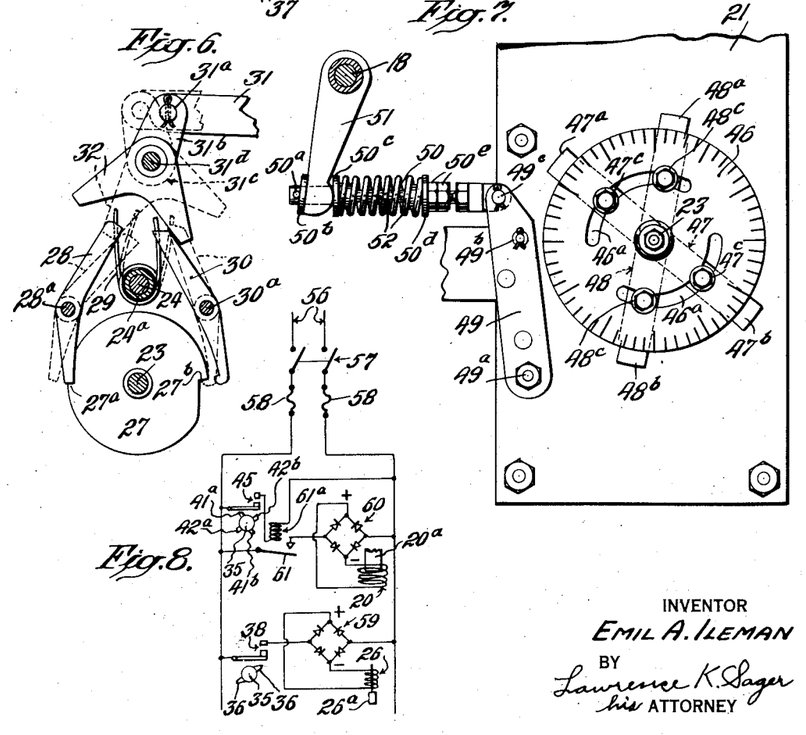
Fig. 6 is a section on the line 6—6 of Fig. 5.
Fig. 7 is an elevation of a portion of the mechanism showing the holding-in control.
Fig. 8 is a diagram of connections.

The main controlling shaft 23 is normally restrained from actuation by a disk 27 fixed to the shaft 23 and having two notches 27a and 27b diametrically opposite each other, as shown in Fig. 6. The disk is restrained under normal conditions by a dog 28 pivoted at about its center on a pin 28a fixed to one of the plates 21. The lower end of the dog 28 is shown engaging the notch 27a and may also engage the notch 27b, the upper end of the dog being spring pressed outwardly by a coil spring 29 enveloping the sleeve 24a and having a pair of upwardly extending ends, one of which exerts pressure against the upper end of the dog 28, thereby tending to force the lower end against the disk 27. The disk is also adapted to be restrained at times by another dog 30 pivotally mounted upon a pin 30a fixed to one of the plates 21. The upper end of this dog is pressed outwardly by one end of the spring 29 which biases the dog 30 to engage one or the other of the notches.

Figure 5:
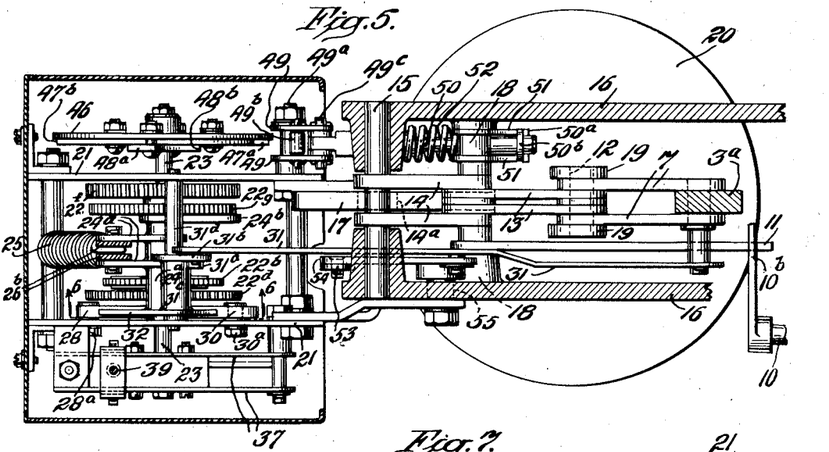
Fig. 5 is a plan view of the control mechanism, partly in section.

The positions of the two dogs 28 and 30 for controlling the action of the disk 27 are dependent upon the condition of the circuit breaker, that is, whether open or closed. Referring to Figs. 1 and 5, there is shown connected to the pin at the lower end of the arm 3a, a link 31 which extends horizontally toward the control mechanism. There it is connected by a pin 31a to an arm 31b which is fixed to a sleeve 31c rotatably mounted on a pin 31d extending between the plates 21, as shown in Figs. 3 and 5. Fixed to one end of the sleeve 31c is a controlling member 32 having two depending legs as well shown in Fig. 6. Figs. 1, 5 and 6 show the position assumed when the breaker is closed; and under this condition, as shown by Fig. 6, the link 31 positions the arm 31b so that the right-hand leg of the controlling member 32 engages the upper end of the dog 30, thereby holding the lower end of this dog away from the disk 27. The dog 28, under this condition, is not engaged by the controlling member 32, and permits the spring 29 to force the upper end of the dog 28 outwardly and its lower end inwardly so as to engage the notch 27a of the disk and thereby restrain the control shaft 23 from rotation.

When the breaker is opened, the link 31 is shifted to the left which causes the left-hand leg of the controlling member 32 to engage the upper end of the dog 28 and thereby release the disk 27. The clock mechanism will then start rotating the shaft 23 and the disk 27. The rotation of the shaft 23 results in the controlling actions hereafter described and will continue for about a one-half revolution, after which it will be stopped either by the dog 28 engaging the notch 27a in case the breaker is closed at that time, or by the dog 30 engaging the notch 27b if the breaker is open at that time.

On opposite ends of the shaft 23 and outside of the supporting plates 21 are a pair of dials carrying cams for securing the controlling effects. The dial 35 at the right of Fig. 3 is shown in face view in Fig. 1. Each half of the dial is shown graduated up to thirty divisions for each half revolution and in each half revolution a complete cycle takes place.

On the face of the dial 35 are fixed two cams 36 which project outwardly and are diametrically opposite to each other. They are adapted to engage successively a cam follower 36a above the disk and in the path of the cams. The follower 36a is pivotally mounted on a support 37 and when engaged by either cam 36, closes a pair of contacts 38 which energizes the winding 26 for rewinding the clock mechanism in the manner already described. The support 37 is pivotally mounted at one end on a pin 37a fixed to its supporting plate 21. A bracket 37b is also fixed to the plate 21 and between the bracket and the unpivoted end of the support 37 is a spring 37c which tends to hold the support 37 in its lower position but is yieldable under pressure of the cams 36 after contact engagement has been made between the contacts 38. A rod 39 is fixed to the support 37 and extends upwardly. Its upper end is screw-threaded and provided with a pair of adjustable nuts 39a under which projects one end of a lever 39b, the other end of which is pivotally supported on the frame of the winding magnet. The lever 39b passes over a pin 40 which is connected to the plunger 26a of the magnet; and when the plunger is in its uppermost position, it will raise the lever 39b and the rod 39 against the pressure of the spring 37c and hold the cam follower 36a out of the path of the cams 36. It thereby avoids unnecessarily energizing the winding magnet when the clock mechanism is in its wound condition. It is apparent that by this means the clock mechanism is automatically wound and kept in condition for actuation of the shaft 23 at all times.

On the inner side of the dial 35 is secured a bar 41 pivotally mounted on the shaft 23 and carrying at its opposite ends a pair of cams 41a and 41b. The bar 41 is adjustable on the shaft by means of a pair of bolts 41c which extend through circular slots 35a in the dial 35, the inner ends of the bolts having a screw threaded engagement with the bar 41. This permits adjustment of the bar and its cams angularly with reference to the dial. Another bar 42 is also pivotally mounted on the shaft 23 back of the bar 41 and carries at its outer ends a pair of cams 42a and 42b. This bar is likewise angularly adjustable in relation to the dial and secured in any desired position by a pair of bolts 42c which extend through the slots 35a and have a threaded engagement at their inner ends with the bar 42.

A cam follower 43 is in the path of the cams 41a, 41b, 42a and 42b and is pivotally mounted on a support 44 so that when engaged by these cams it will close a circuit between contacts 45 carried on the support 44. This supoprt is pivotally mounted at one end upon a pin 44a fixed to the plate 21. A bracket 44b fixed to the plate 21 supports a spring 44c which yieldably carries the opposite end of the support 44 and thereby permits depression of the support 44 when the cam follower is engaged by a cam and after the contacts 45 have been closed. From this particular disclosure it is evident that during each half revolution of the dial 35, the cam follower 43 will be engaged first by one of the cams and then by another. The circuit closed by the cam follower 43 controls the energization of the closing magnet 20 of the breaker; and it follows that after the breaker has been opened, it will be re- closed twice during a half revolution of the dial 35.

The dial 46 on the opposite end of the shaft 23 is shown in Fig. 7. It is graduated similarly to the other dial and carries on its inner side a bar 47 carrying at its outer ends a pair of cams 47a and 47b which project beyond the face of the dial. This bar is pivotally mounted upon the shaft 23 and fixed in any desired position by a pair of bolts 47c which pass through circular openings 46a in the dial 46 and have a threaded engagement at their inner ends with the bar 47. Another bar 48 is similarly mounted on the inner face of the bar 47 and carries at its outer ends a pair of cams 48a and 48b which project beyond the dial 46. The bar 48 is angularly adjustable about the shaft 23 and secured in any desired position by the bolts 48c passing through the slots 46a and having a threaded engagement at their inner ends with the bar 48.

In the path of the cams 47a, 47b, 48a and 48b is a cam follower 49. It is pivoted at its lower end on a pin 49a which is fixed to a supporting plate 21. It comprises two parallel sides, as shown in Fig. 3 and Fig. 5. Near the upper end of the cam follower and supported between the plates thereof is a roller 49b. When each cam 47a, 48a, 47b and 48b comes opposite this roller by the rotation of the control shaft 23, it will prevent the pivoted element 49 from being forced toward the dial, but when these cams are not opposite the roller, the element 49 is free to move on its pivot towards the dial.

The sides of the element 49 are connected at their upper ends by a pin 49c and pivotally connected thereto is a horizontally extending rod 50 which, as shown in Figs. 1 and 5, extends rearwardly and under the latch shaft 18. Fixed to the latch shaft is a pair of downwardly extending plates 51 which embrace opposite sides of the inner end of the rod 50, these plates being connected together by a cross strip under the rod 50 for holding that end of the rod. A pin 50a passes through the rod 50 at its inner end and against this is a washer 50b which retains the lower ends of the plates 51 on the rod. A washer 50c is located on the rod and is forced against the lower end of the plates 51 by a spring 52 which encircles the rod, being compressed somewhat at its opposite end by a washer 50d and adjustable nuts 50e on the rod.

It is apparent that when no cam engages the roller 49b, the latch shaft is free to turn and permit the breaker to open instantaneously upon the occurrence of overload; but if one of the cams 47a, 48a, 47b and 48b is opposite the roller 49b then, upon the occurrence of overload, the turning of the latch shaft is opposed by the movement of the element 49 being restrained and also by the tension of the spring 52 being sufficient so that it is not overcome by the torque on the latch shaft due to moderate overloads. If, however, the overload is pronounced and beyond a predetermined limit, then, even if the element 49 be locked from movement by one of the cams, the torque of the latch shaft 18 will be sufficient to overcome the tension of the spring 52 and thereby permit the release of the pin 14a from its latch and permit the opening of the breaker. The tension of the spring 52 is adjustable by the nuts 50e and thereby determines the limit above which the breaker will be opened even when the element 49 is restrained in its movement. Thus the mechanism will always permit instantaneous opening of the breaker regardless of other considerations provided the overload is above a predetermined limit.

The open and closed positions of the breaker are indicated by a suitably marked plate in a readily observable position carried by a link 53 shown broken away in Fig. 1. It is connected to a bell crank lever 54 pivoted on a shaft 55 supported by one of the plates 16. The other end of the lever 54 is connected by a pin and slot connection to the link 31 already described as connected to the lower end of the arm 3a. Thus the position of the indicator plate connected to the link 53 will show whether the breaker is open or closed.

When the breaker has been locked out in the open position by the control mechanism, the breaker must be closed manually. For this purpose a rod 19a is extended from the lower end of the plunger of the magnet 20, carrying an adjustable nut 19b at its lower end, as shown in Fig. 1. An auxiliary hand lever 19c is provided having a forked end adapted to embrace the rod 19a and seat aganist the nut 19b. A portion of the lever 19c then engages the lower rim of the closing magnet frame and by raising the handle of the lever, the plunger will be forced downwardly and thereby manually close the breaker when such closing becomes necessary.

Fig. 3 shows a diagram of circuit connections. The alternating current source is indicated by the supply mains 56 in connection with which is a double pole switch 57 and fuses 58. The magnet for intermittently winding the clock mechanism is supplied with current from a rectifier 59 connected between the mains through the switch contacts 38. These contacts are normally open and intermittently closed by the cams 36 in the manner already described. The positive and negative terminals of the rectifier 59 are connected to the winding 26 of the clock mechanism. The closing coil 20 of the breaker is connected to the positive and negative terminals of a rectifier 60 which is connected to the supply mains through a magnetic switch 61 having a closing winding 61a. This winding is connected across the supply lines through the switch having the contacts 45 already described as being intermittently closed by cams 41a, 42b, 41b and 42a. It is apparent that upon each closing of the contacts 45 by the cams, the relay winding 61a will be momentarily energized which will cause the closing of its contact 61 and thereby cause the rectifier to supply current to the closing winding 20 of the breaker and move its plunger 20a downwardly.

The operation may be described by assuming the breaker to be in its closed position and that an overload occurs on some branch circuit of the line controlled by the breaker. This will cause the instantaneous tripping of the breaker in the usual manner which, as already described, will release the dog 28 from the disk 27 and permit the control shaft 23 to be actuated by the clock mechanism. Referring to Fig. 1, this starts the dial 35 in a clockwise rotation and after a few seconds the cam 41b will engage the cam follower 43 and thereby reclose the breaker. Referring to Fig. 7, the starting of the control shaft 23 will rotate the dial 46 in a counter-clockwise direction; and when the breaker is closed by the action of the cam 41b, the cam 47a has come opposite the roller 49b and restrains the element 49 from movement for a few seconds after the closing of the breaker. Consequently, even if the overload persists, tending to trip the breaker, the cam 47a will prevent such action in the manner already described, unless the overload is above a predetermined limit. Such excessive overload will cause the instantaneous opening of the breaker by overcoming the pressure of the spring 52 and permitting the opening of the breaker in the manner already explained.

The continued movement of the shaft 23 will cause the cam 47a to move out of the path of the roller 49b after a short interval of time and then if a normal overload persists, the breaker will automatically open. However, if during the interval of delayed opening of the breaker by the cam 47a, the cause of the overload has been removed either by the opening of the fuses on the branch circuit where the fault arose or in any other manner, then the breaker will remain closed and thereby restore the line controlled by the breaker to service. In that event the control shaft 23 will continue its rotation for a half revolution when it will be stopped by the dog 28 engaging the notch 27b of the disk 47. The breaker and control mechanism is then in normal condition for being actuated upon the occurrence of any future overload.

If, however, the overload still persists after the first reclosure of the breaker, and again opens the breaker as soon as the cam 47a has passed beyond the roller 49b, the continued rotation of the shaft 23 will cause the cam 42b to engage the cam follower 43 after a certain interval of time and thereby cause a second reclosure of the breaker. When the breaker is thus closed, the cam 48a has come opposite the roller 49b and restrains the breaker from opening under a normal overload for a short time interval, although permitting instantaneous opening if the overload is excessive. After the cam 48a has passed the roller 49b the breaker may open if the normal overload still persists. If the cause of the overload has been removed before the cam 48a passes the roller 49b, the breaker will remain closed and the rotation of the shaft 23 will continue until the dog 28 engages the notch 27b, thereby restoring the parts to normal condition. If, however, the breaker has been again opened due to a continued normal or excessive overload, the breaker will remain open. The rotation of the shaft 23 will then continue until the notch 27a is engaged by the dog 30 which will restrain further movement of this shaft. This is due to the fact that the breaker by remaining open will cause the parts to assume the position shown in dotted lines in Fig. 6.

The breaker must then be reclosed manually; and if the cause of the overload has in the meantime been removed, the manual closing of the breaker will force the dog 30 to release the disk 27 and permit the dog 28 to engage the notch 27b. It will be noted from Fig. 6 that the dog 30 engages the notches of the disk 27 at a position which is not diametrically opposite the position of engagement by the dog 28. The notch in the dog 30 being shown somewhat above a horizontal extending from the lower end of the dog 28. Consequently when the dog 30 releases the disk by the manual closing of the breaker, the dog 28 has an opportunity to move to engage the disk before the notch 27b reaches the end of the dog 28. The mechanism is then in condition to perform the cycle of operations already described according to the controlling conditions. The performing of a complete cycle during each half revolution of the breaker and the short movement of the disk from a position when engaged by the dog 30 to that when engaged by the dog 28 overcomes the going through of a complete cycle of control after manual closure of the breaker.

It is apparent that each cycle of operations occurs during each half revolution of the shaft 23; and the tension of the spring 25 which actuates the control mechanism is increased intermittently, as the occasion may require, by the intermittent excitation of the magnet winding 26. The time intervals during which the breaker remains open after being automatically opened and before the reclosures, may be changed to suit particular requirements by adjusting the cam bars 41 and 42 angularly about the shaft 23 and then clamped in any desired position by the bolts 41c and 42c. These time intervals may be changed from a few to several seconds. Likewise the time intervals during which the opening of the breaker is delayed by the holding cams may be varied by adjustment of the cam bars 47 and 48 from a fraction of a second to more than a second. Thus this adjustment may be made so that when the breaker is reclosed the leading portion of the cam will engage the roller 49b giving the maximum delayed opening of the breaker, or the adjustment may be made so that a holding cam will engage the roller 49b a short interval before the circuit breaker is reclosed and thereby reduce the holding time to a fraction of a second if desired. Also the timing of the delay interval may be changed by changing the length of the faces of the cams 47a, 47b, 48a and 48b so as to lengthen or shorten the time during which such cams will be opposite the roller 49b. Thus the control mechanism is readily adapted to fulfill any desired timing of the various controlling factors involved. The structure shown is adapted to carry out a complete cycle of operations in about thirty seconds which is the time occupied in a half revolution of the control shaft 23, although this time interval may be varied to suit particular requirements.

Figure 9:
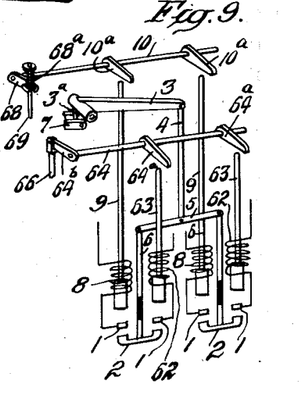
Fig. 9 is a diagrammatic sketch generally indicating parts of the circuit breaker and tripping mechanism of a modified form.
Figure 10:
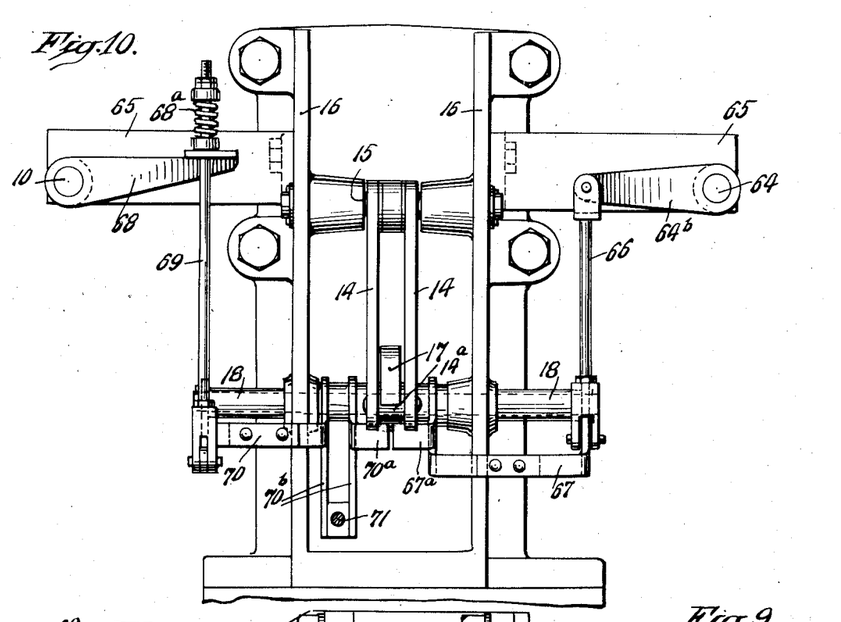
Fig. 10 is an end view of the modified mechanism.
Figure 11:
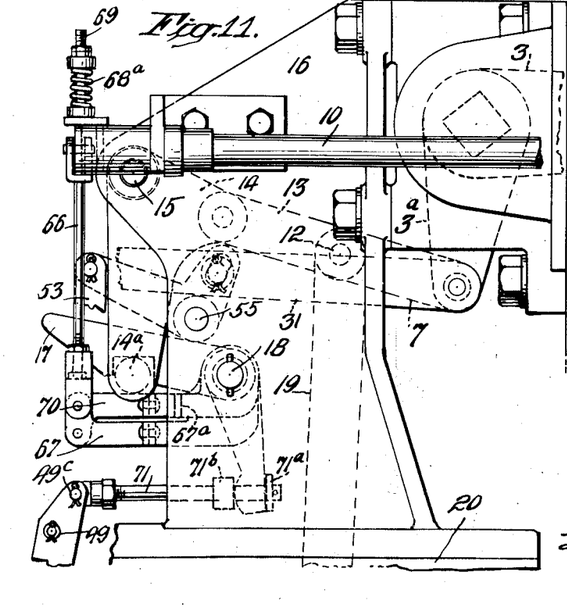
Fig. 11 is a side view thereof.

In the apparatus already described, it may sometimes occur that after the first or second automatic reclosure of the breaker, it may be opened instantaneously even though an excessive current may not exist in any one phase or circuit of the breaker. This is due to the fact that moderate overloads on more than one circuit of the breaker have a cumulative action in turning the trip shaft 10 shown in Fig. 2. This cumulative action may be sufficient to overcome the tension of the spring 52 and thereby open the breaker even though one of the holding cams may be engaging the rollers 49b. Figs. 9, 10 and 11 show a modified form of structure in which this cumulative effect cannot open the breaker instantaneously when one of the holding cams is effective.

Referring to Fig. 9, the parts corresponding to those already referred to in Fig. 2 are indicated by the same reference characters. In addition to the trip coils 8, another pair of overload trip coils 62 are connected in or related to the two circuits shown and are adapted to raise the trip rods 63 and engage the arms 64a respectively. These arms are fixed to an additional trip shaft 64. In this form of apparatus, the overload coils 8 and their armatures or plungers are adjusted to actuate the trip shaft 10 upon the occurrence of a moderate overload in any one of the circuits and instead of utilizing the spring 52 to permit the same trip shaft to open the breaker instantaneously upon the occurrence of excessive overload in the manner already described, the spring 52 is not utilized and the opening of the breaker by the trip shaft 10 is definitely prevented by the cams 47a, 48a, 47b and 48b for short intervals after the breaker is automatically reclosed. It follows that any cumulation of moderate overloads in the two or more circuits controlled cannot result in opening the breaker by actuation of the trip shaft 10. Any one of the overload trip coils 62 of the breaker may, however, open the breaker instantaneously upon the occurrence of an excessive overload in any one of the circuits because such overload coils are adjusted to actuate the trip shaft 64 only when the overload in any one circuit exceeds a predetermined excessive amount. For example, if each of the overload trip magnets 8 are adjusted to actuate the trip shaft 10 upon the occurrence of an overload in any one circuit of 100 amperes, the trip magnets 62 may each be adjusted to operate when the overload in its respective circuit exceeds 150 amperes which may be regarded as an excessive amount requiring the instantaneous opening of the breaker. And this action of the trip coils 62 on the trip shaft 64 cannot instantaneously open the breaker by the cumulative effect of less than 150 amperes in any one circuit because no one of the trip coils 62 can act until the overload current exceeds 150 amperes in some one circuit. In securing the desired result, the structure is arranged so that the trip shafts 10 and 64 may act independently in turning the restraining latch 17 of the breaker.

In Figs. 10 and 11 the parts corresponding to those already described are similarly numbered. At the outer sides of the supporting frames 16 are secured a pair of brackets 65 which form bearing supports for the respective trip shafts 10 and 64. An arm 64b is fixed to the trip shaft 64 and at its inner end is pivotally connected a downwardly extending rod 66. The lower end of this rod is pivotally connected to the outer end of a metal strip 67 which is turned towards the central portion of the mechanism and then is bent to extend inwardly where it is pivotally mounted upon the latch shaft 18. An extension 67a from the strip 67 extends forwardly and is then bent at right-angles to come under a portion of the latch 17. When the trip shaft 64 is turned due to an excessive overload in any one of the circuits, it is apparent that it will raise the latch 17 and release the pin 14a instantaneously and regardless of any other conditions. It thereby permits the breaker to open instantaneously when an excessive load exists in any one of the circuits. The trip shaft 10 has an arm 68 fixed thereto which is yieldably connected through a spring 68a to the upper end of a downwardly extending rod 69. The lower end of this rod is pivotally connected to one end of a metal strip 70 which is bent to extend towards the center part of the mechanism and then bent inwardly to engage the shaft 18 on which it is pivotally mounted at its inner end. Another strip 70a is similarly pivotally mounted upon the latch shaft 18 and is provided with an extension which is bent to come under a portion of the latch 17 opposite the similar extension 67a. The strips 70 and 70a are respectively provided with downward extensions 70b connected together at their lower ends. The lower ends of the extensions 70b embrace opposite sides and pass under the end of a rod 71 and support that end of the rod. A washer 71a and pin at the end of the rod and a block 71b on the rod prevent the rod from appreciable longitudinal movement with reference to the extensions 70b. The other end of the rod is pivotally connected to the upper end of the cam follower 49 already described and particularly shown in Figs. 1 and 7.

In view of the overload trip coils 8 being set to respond upon the occurrence of moderate overloads in one or more of the circuits, the trip shaft 10 would be actuated upon the occurrence of such a condition. This would result in raising the rod 69 through the medium of the stiff spring 68a and thereby turn the strips 70 and 70a upon the latch shaft 18 causing the extension 70a to raise the latch 17 and trip the breaker to open. However, when one of the cams 47a, 48a, 47b, and 48b is opposite the roller 49b of the cam follower, the actuation of the trip shaft 10 by the persistence of a moderate overload, or the cumulative action of moderate overloads in the trip coils 8, cannot open the breaker. Under such conditions the arm 68 on the trip shaft 10 compresses the spring 68a without effecting the release of the latch 17. This is because there is no compression spring on the rod 71, such as the spring 52 shown in Figs. 1 and 7 of the previously described apparatus for permitting instantaneous opening of the breaker when the roller 49b is opposite one of the holding cams. If the overload still persists in one or more of the trip coils 8, after a holding cam has passed the roller 49b, the breaker will be automatically opened, as the release of the rod 71 will permit movement of the strips 70 and 70a to trip the latch 17. It will be understood that the control mechanism already described with reference to Figs. 1 to 8 will be incorporated with the disclosures of Figs. 9 to 11, except as modified in Figs. 9 to 11.

Thus in the structure of Figs. 9 to 11 and the control mechanism related thereto, it will be apparent that any time an excessive overload exists in any one or more of the circuits, the breaker will be opened instantaneously by actuation of the trip shaft 64 which results in tripping the latch 17; and upon such an occurrence, the movement of the link 31 will cause the dog 28 to release the disk 27. This will permit the actuation of the shaft 23 by the control mechanism and the cycle of operations already described with reference to Figs. 1 to 8 will then follow, subject to instantaneous opening of the breaker if the excessive overload persists after each reclosure.

Similarly upon the occurrence of a moderate overload, the trip shaft 10 will be actuated to trip the breaker and release the shaft 23 for actuation of the control mechanism. The cycle of operations already described with reference to Figs. 1 to 8 will be passed through, with the exception that the breaker is not permitted to open by the action of the trip shaft 10 even under an excessive overload during the intervals when one of the cams is opposite the roller of the cam follower 49.

Although particular embodiments of the invention have been shown and described, it will be understood that various modifications may be made without departing from the scope of the invention.

I claim:

1. The combination of an overload circuit breaker, a power driven mechanism, means for normally restraining said mechanism from movement and for releasing the same upon the opening of the breaker and for again restraining said mechanism after a predetermined movement thereof, a magnet for closing the breaker, a device actuated by said mechanism for energizing said magnet for reclosing the breaker after the breaker has been opened, and a device actuated by said mechanism for delaying the automatic reopening of the breaker for a time interval after reclosing.

2. The combination of an overload circuit breaker, an electromagnet for closing the breaker, a rotatable control shaft, a spring actuated timing mechanism for actuating said shaft at a fixed rate, means for normally restraining said shaft from movement and for releasing said shaft upon the opening of the breaker and for again restraining said shaft after a predetermined rotation thereof, and means controlled by the rotation of said shaft after a predetermined time interval for energizing said electromagnet to reclose the breaker.

3. The combination of an overload circuit breaker, an electromagnet for closing the breaker, a rotatable control shaft, a spring actuated timing mechanism for actuating said shaft at a fixed rate, means for normally restraining said shaft from movement and for releasing said shaft upon the opening of the breaker and for again restraining said shaft after a predetermined rotation thereof, means controlled by the rotation of said shaft after a predetermined time interval for energizing said electromagnet to reclose the breaker, and means controlled by the movement of said shaft for restoring energy to said spring mechanism.

4. The combination of an overload circuit breaker, an electromagnet for closing the breaker, a rotatable control shaft, an escapement mechanism for controlling the rotation of said shaft at a fixed rate, a tension spring for driving said mechanism, means for normally restraining said shaft from movement and for releasing said shaft upon the opening of the breaker and for again restraining said shaft after a predetermined rotation thereof, an electromagnet for increasing the tension of said spring, means controlled by the rotation of said shaft after a predetermined time interval for energizing said first named electromagnet to reclose the breaker, and means controlled by the rotation of said shaft for intermittently energizing said second named electromagnet for intermittently increasing the tension of said spring.

5. The combination of an overload circuit breaker, a power mechanism, a shaft driven by said mechanism in one direction only when released, electromagnetic means controlled by the rotation of said shaft for reclosing the breaker after it has been automatically opened, means comprising a stop for normally restraining said shaft from movement when the breaker is closed and for releasing the same upon the opening of the breaker and a second stop for restaining said shaft after a predetermined movement thereof in said direction in case the breaker opens after reclosing and for releasing said second stop and again restraining said shaft by said first named stop after a further predetermined movement thereof from said second stop upon manually reclosing the breaker.

6. The combination of an overload circuit breaker, a power mechanism, electromagnetic means controlled by said mechanism for reclosing the breaker after it has been automatically opened, a rotatable element driven by said mechanism in one direction only when released, a movable element actuated by the opening and closing of the breaker for normally restraining said rotatable element and mechanism from movement in one position thereof when the breaker is closed and for releasing said rotatable element when the breaker is opened, and a second movable element actuated by the opening and closing of the breaker for normally restraining said rotatable element in a different position thereof when the breaker is open and for releasing said rotatable element when the breaker is closed.

7. The combination of an overload circuit breaker, a power mechanism, electromagnetic means controlled by said mechanism for reclosing the breaker after it has been automatically opened, a rotatable element driven by said mechanism in one direction only when released and having two oppositely disposed projections, and a pair of yieldable dogs adapted to engage said projections for restraining said rotatable element and mechanism from movement, one of said dogs being actuated by the closing of the breaker to engage one of said projections and the other of said dogs being actuated by the opening of the breaker to engage one of said projections when said rotatable element is in a different angular position from that when restrained by the other of said dogs.

8. The combination of an overload circuit breaker, a power mechanism, electromagnetic means controlled by said mechanism for reclosing the breaker after it has been automatically opened, a rotatable disk driven by said mechanism in one direction only when released and having two diametrically opposed projections, and a pair of yieldable dogs adapted to engage said projections for restraining said rotatable element and mechanism from movement, one of said dogs being actuated by the closing of the breaker to engage one of said projections and the other of said dogs being actuated by the opening of the breaker to engage the other of said projections when said disk has rotated less than a half revolution.

9. The combination of a circuit breaker, overload tripping means for automatically and instantaneously opening the breaker, means controlled by the opening of the breaker for automatically reclosing the breaker after opening, and auxiliary means for mechanically restraining a further automatic opening of the breaker by said tripping means for a predetermined time interval after reclosing and for removing said restraint after said time interval.

10. The combination of a circuit breaker, overload tripping means for automatically and instantaneously opening the breaker, means controlled by the opening of the breaker for automatically reclosing the breaker after opening, auxiliary means for mechanically restraining a further automatic opening of the breaker by said tripping means for a predetermined time interval after reclosing and for removing said restraint after said time interval, and means for adjusting the duration of such time interval.

11. The combination of a circuit breaker, overload tripping means for automatically and instantaneously opening the breaker, means controlled by the opening of the breaker for automatically reclosing the breaker after opening, and auxiliary means for yieldably restraining a further automatic opening of the breaker by said tripping means for a predetermined time interval after reclosing and for removing said restraint after said time interval and for permitting the automatic opening by said tripping means before the completion of such time interval if the overload exceeds a predetermined value.

12. The combination of a circuit breaker, overload tripping means for automatically and instantaneously opening the breaker, means controlled by the opening of the breaker for automatically reclosing the breaker after opening, auxiliary means for yieldably restraining a further automatic opening of the breaker by said tripping means for a predetermined time interval after reclosing and for removing said restraint after said time interval and for permitting the automatic opening by said tripping means before the completion of such time interval if the overload exceeds a predetermined value, and means for adjusting said predetermined value.

13. The combination of a circuit breaker, overload tripping means for automatically and instantaneously opening the breaker, means controlled by the opening of the breaker for automatically reclosing the breaker after at least two automatic openings, and auxiliary means for mechanically restraining the automatic opening of the breaker by said tripping means for a predetermined time interval after each reclosing and for removing said restraint after said time interval.

14. The combination of a circuit breaker, overload tripping means for automatically and instantaneously opening the breaker, means controlled by the opening of the breaker for automatically reclosing the breaker after at least two automatic openings, auxiliary means for mechanically restraining the automatic opening of the breaker by said tripping means for a predetermined time interval after each reclosing and for removing said restraint after said time interval, and means for adjusting the duration of such time interval.

15. The combination of an overload circuit breaker, overload tripping means for automatically and instantaneously opening the breaker, means controlled by the opening of the breaker for automatically reclosing the breaker after opening, and auxiliary yieldable means for mechanically restraining a further automatic opening of the breaker by said tripping means for a predetermined time interval after reclosing and for removing said restraint after said time interval and for yielding to permit instantaneous opening of the breaker if the overload is excessive during such time interval.

16. The combination of a circuit breaker, overload tripping means for automatically and instantaneously opening the breaker, means controlled by the opening of the breaker for automatically reclosing the breaker after opening, auxiliary means for mechanically restraining a further automatic opening of the breaker by said tripping means for a predetermined time interval after reclosing upon the occurrence of a moderate overload and for removing said restraint after said time interval, and auxiliary means for opening the breaker instantaneously if the overload is excessive.

EMIL A. ILEMAN.